(12) United States Patent
Yoo et al.

(10) Patent No.: US 10,067,584 B2
(45) Date of Patent: Sep. 4, 2018

(54) FILMS FOR WRITING AND DISPLAY APPARATUSES INCLUDING THE SAME

(71) Applicant: Samsung Electronics Co., Ltd., Suwon-si, Gyeonggi-do (KR)

(72) Inventors: Inkyeong Yoo, Yongin-si (KR); Jungwoo Kim, Hwaseong-si (KR); Byeonghak Kang, Suwon-si (KR); Kwonyoung Kim, Seoul (KR); Jongwan Kim, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 103 days.

(21) Appl. No.: 14/838,710

(22) Filed: Aug. 28, 2015

(65) Prior Publication Data

US 2016/0077347 A1 Mar. 17, 2016

(30) Foreign Application Priority Data

Sep. 17, 2014 (KR) .......................... 10-2014-0123702

(51) Int. Cl.
  *G06F 3/041* (2006.01)
  *G02B 1/00* (2006.01)
  (Continued)

(52) U.S. Cl.
  CPC .......... *G06F 3/0412* (2013.01); *G02B 1/005* (2013.01); *G02B 1/14* (2015.01); *G02B 5/201* (2013.01); *G02B 5/26* (2013.01)

(58) Field of Classification Search
  CPC ......... G06F 3/0412; G02B 1/14; G02B 1/005; G02B 5/201; G02B 5/26
  See application file for complete search history.

(56) References Cited

U.S. PATENT DOCUMENTS 4,554,562 A * 11/1985 Afzali-Ardakani .... B41M 5/245
                                                 346/135.1
2011/0083798 A1* 4/2011 Lee ......................... B29C 35/02
                                                 156/243

(Continued)

FOREIGN PATENT DOCUMENTS

JP         2008-269545 A     11/2008
KR      1020110096849 A      8/2011
(Continued)

OTHER PUBLICATIONS

Alexander N. Poddubny et al., "Fano interference governs wave transport in disordered systems" Nature Communications Jun. 26, 2012 Macmillan Publishers Limited.

*Primary Examiner* — Sahlu Okebato
(74) *Attorney, Agent, or Firm* — Harness, Dickey & Pierce, PLC

(57) ABSTRACT

A film for writing may include: a rough layer, including a non-flat surface, configured to transmit a first light beam and a second light beam of different wavelength bands; and/or a photonic crystal layer, arranged on the rough layer, configured to transmit the first light beam and configured to reflect the second light beam. A film for writing, which transmits visible rays, may include: a non-flat layer. A difference between a maximum thickness and a minimum thickness of the non-flat layer may be from about 220 nanometers (nm) to about 2 microns (μm). A film for writing may include: a first layer; and/or a second layer on the first layer. The first layer may be configured to transmit first and second light beams of different frequency bands. The second layer may be configured to transmit the first light beam, but to reflect the second light beam.

18 Claims, 10 Drawing Sheets

(51) Int. Cl.
*G02B 1/14* (2015.01)
*G02B 5/20* (2006.01)
*G02B 5/26* (2006.01)

(56) References Cited

U.S. PATENT DOCUMENTS

| | | |
|---|---|---|
| 2012/0200688 A1 | 8/2012 | Endo et al. |
| 2013/0163048 A1 | 6/2013 | Kida et al. |
| 2013/0285894 A1 | 10/2013 | Marti |
| 2014/0085661 A1 | 3/2014 | Nakajo et al. |
| 2014/0103218 A1* | 4/2014 | Wieczorek ............ H01L 31/055 250/363.03 |
| 2014/0191110 A1* | 7/2014 | Holenarsipur ............ G06F 3/03 250/206 |
| 2016/0025564 A1* | 1/2016 | Zhang ....................... G01J 3/12 356/326 |

FOREIGN PATENT DOCUMENTS

| | | |
|---|---|---|
| KR | 101228512 B1 | 1/2013 |
| KR | 1020130119250 A | 10/2013 |

* cited by examiner

FILMS FOR WRITING AND DISPLAY APPARATUSES INCLUDING THE SAME

CROSS-REFERENCE TO RELATED APPLICATION(S)

This application claims priority from Korean Patent Application No. 10-2014-0123702, filed on Sep. 17, 2014, in the Korean Intellectual Property Office (KIPO), the entire contents of which are incorporated herein by reference.

BACKGROUND

1. Field

Some example embodiments may generally relate to films for writing. Some example embodiments may generally relate to display apparatuses including the films for writing.

2. Description of Related Art

Along with rapid developments of information and communication technologies today, a video apparatus (e.g., a portable terminal), may include not only functions like phone call and text message, but also functions including digital multimedia broadcasting (DMB), Moving Picture Experts Group (MPEG)-1 or MPEG-2 Audio Layer III (MP3) players, games, facsimiles, e-mails, etc., thus being a complex portable computer.

The portable computer may also be used as an electronic learning device for education. An electronic learning device may remotely maximize interactions between an educator and an educatee. If notes handwritten by an educatee and an educator are shared in real time, smooth interactions between the educator and the educatee may be maximized.

However, many currently available mobile terminals may not support a handwriting function for writing thereon with a pen. Even mobile terminals supporting a handwriting function may include screen units for writing with little roughness. Therefore, users thereof may fail to get impressions like actual handwriting (e.g., the feel associated with actual handwriting). Therefore, there may be a limit for using handwriting function of a portable device.

SUMMARY

Some example embodiments may provide films for writing with designated surface roughnesses.

Some example embodiments may provide display apparatuses that include films for writing with designated surface roughnesses.

Some example embodiments may provide films for writing that transmit light of visible ray wavelengths and reflect light of particular wavelengths.

Some example embodiments may provide display apparatuses that include films for writing that transmit light of visible ray wavelengths and reflect light of particular wavelengths.

In some example embodiments, a film for writing may comprise: a rough layer, comprising a non-flat surface, configured to transmit a first light beam and a second light beam of different wavelength bands; and/or a photonic crystal layer, arranged on the rough layer, configured to transmit the first light beam and configured to reflect the second light beam.

In some example embodiments, a difference between a maximum thickness and a minimum thickness of the rough layer may be from about 220 nanometers (nm) to about 2 microns (μm).

In some example embodiments, the rough layer may be transparent. The photonic crystal layer may be transparent.

In some example embodiments, the non-flat surface of the rough layer may comprise: a first surface perpendicular to a direction in which the first light beam is configured to travel; and/or a second surface parallel to the direction in which the first light beam is configured to travel.

In some example embodiments, the rough layer may have a mesh structure comprising a plurality of openings.

In some example embodiments, at least one of the diameter of each of the plurality of openings and a distance between openings adjacent to each other may be less than or equal to a wavelength of the second light beam.

In some example embodiments, the rough layer may further comprise: a plurality of lines spaced apart from one another.

In some example embodiments, at least one of width of each of the plurality of lines and a distance between lines adjacent to each other may be less than or equal to a wavelength of the second light beam.

In some example embodiments, the rough layer may further comprise: a plurality of protrusions spaced apart from one another.

In some example embodiments, the first light beam may be incident via a bottom surface of the photonic crystal layer. The second light beam may be incident via the non-flat surface of the rough layer.

In some example embodiments, the wavelength band of the first light beam may be a visible band. The wavelength band of the second light beam may be an infrared band.

In some example embodiments, in the photonic crystal layer, a plurality of layers having different refractive indexes may be alternately stacked.

In some example embodiments, the photonic crystal layer may comprise: a medium; and/or a plurality of nanoparticles distributed in the medium in a lattice structure.

In some example embodiments, the film for writing may further comprise: a self-curing layer in contact with the rough layer. The self-curing layer may be configured to repair damage to the self-curing layer caused by external shock.

In some example embodiments, the film for writing may be configured to attach to and detach from a display apparatus.

In some example embodiments, a film for writing, which transmits visible rays, may comprise: a non-flat layer. A difference between a maximum thickness and a minimum thickness of the non-flat layer may be from about 220 nanometers (nm) to about 2 microns (μm).

In some example embodiments, the film for writing may further comprise: a self-curing layer in contact with the non-flat layer. The self-curing layer may be configured to repair damage to the self-curing layer caused by external shock.

In some example embodiments, a display apparatus, may comprise: a display panel; and/or a film for writing on the display panel. The film for writing may comprise a rough layer, comprising a non-flat surface, configured to transmit a first light beam and a second light beam of different wavelength bands; and/or a photonic crystal layer, arranged on the rough layer, configured to transmit the first light beam and configured to reflect the second light beam.

In some example embodiments, the non-flat surface of the rough layer of the film for writing may be exposed to outside of the display apparatus.

In some example embodiments, the display apparatus may further comprise: a touch panel between the film for writing and the display panel. The film for writing may contact the touch panel.

In some example embodiments, a film for writing may comprise: a first layer; and/or a second layer on the first layer. The first layer may be configured to transmit first and second light beams of different frequency bands. The second layer may be configured to transmit the first light beam, but to reflect the second light beam.

In some example embodiments, the first layer may be a non-flat layer.

In some example embodiments, a difference between a maximum thickness and a minimum thickness of the first layer may be greater than or equal to about 220 nanometers (nm) and less than or equal to about 2 microns (μm).

In some example embodiments, the first layer may be transparent.

In some example embodiments, the second layer may be transparent.

In some example embodiments, the second layer may comprise a plurality of nanoparticles.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1A:
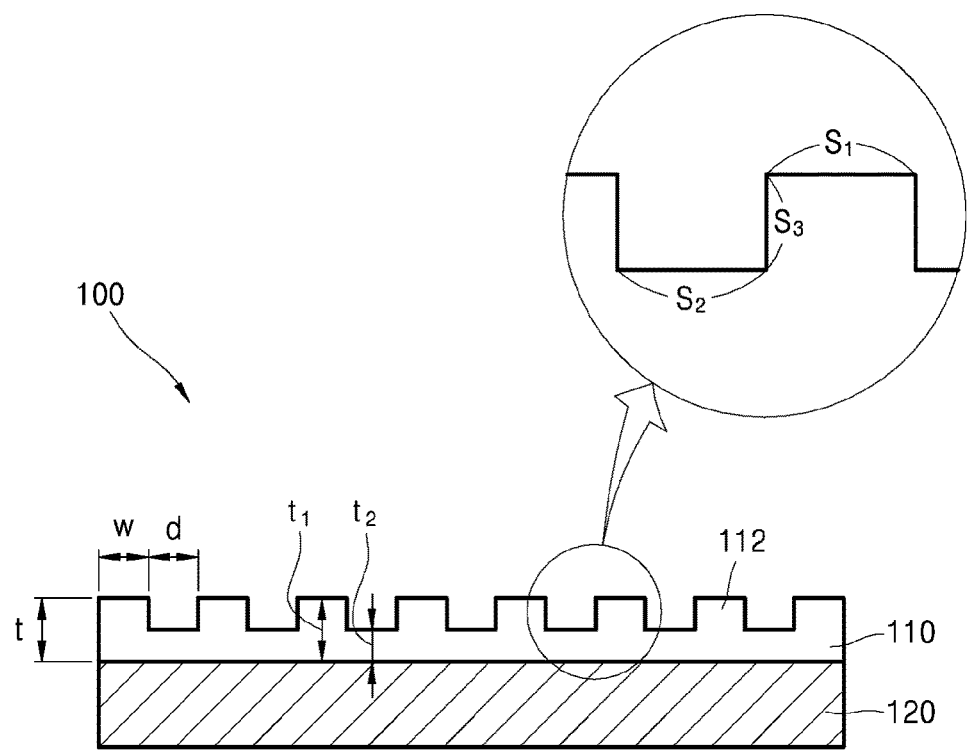
FIG. 1A is a sectional view of a film for writing according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Reference will now be made to example embodiments, which are illustrated in the accompanying drawings, wherein like reference numerals may refer to like components throughout.

Figure 1B:
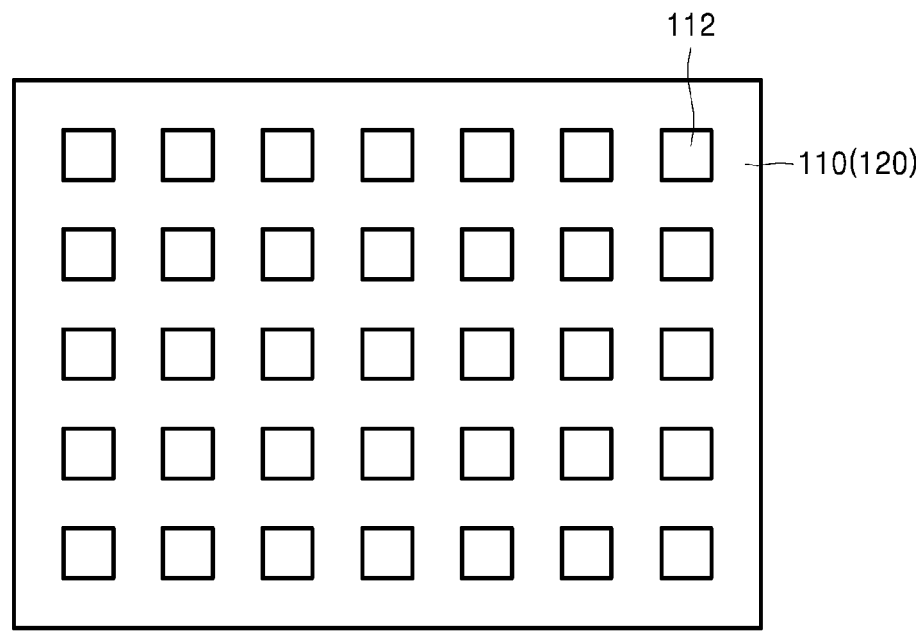
FIG. 1B is a plan view of the film for writing of FIG. 1.

FIG. 1A is a sectional view of a film for writing 100 according to some example embodiments, and FIG. 1B is a plan view of the film for writing 100 of FIG. 1A. The film for writing 100 includes a rough layer 110, which has a non-flat surface and transmits both a first light beam and a second light beam of different wavelength bands, and a photonic crystal layer 120, which transmits the first light beam but reflects the second light beam due to a photonic band gap characteristic. The film for writing 100 may be arranged at the outermost location of a display apparatus. Therefore, a user may write on the film for writing 100. Here, the first light beam may be light emitted by a display apparatus via the photonic crystal layer 120 and the rough layer 110, whereas the second light beam may be light that is incident from outside via a surface of the rough layer 110, reflected by the photonic crystal layer 120, and is emitted back to outside via the rough layer 110.

The rough layer 110 includes a non-flat surface, where the surface may have a surface roughness. Therefore, when a user writes on the surface of the rough layer 110 by contacting a writing tool (e.g., a pen), the user may get impressions like actual handwriting due to the surface roughness of rough layer 110.

For the rough layer 110 to have a surface roughness, the rough layer 110 may have an embossed surface as shown in FIG. 1A. In other words, thickness 't' of the rough layer 110 may not be uniform. The thickness T may include a first thickness t1 and a second thickness t2 alternately. For example, the rough layer 110 may include a plurality of protrusions 112 in a direction in which light travels. The protrusions 112 may have a polygonal shape, such as a triangular shape or a rectangular shape, a circular shape, an elliptical shape, and any of various other shapes.

The plurality of protrusions 112 may be 2-dimensionally (2D) arranged. Therefore, the rough layer 110 may include a first surface S1 corresponding to the first thickness t1, a second surface S2 corresponding to the second thickness t2, and a third surface S3 interconnecting the first surface S1 and the second surface S2. The first surface S1 and the second surface S2 may be arranged next to each other at different heights, where the third surface S3 may be arranged in perpendicular to the first surface S1 and the second surface S2. The first through third surfaces S1, S2, and S3 may have equal areas and, thus, surface roughness of the rough layer 110 may be uniform. Although FIG. 1A shows that the thickness 't' of the rough layer 110 includes the first thickness t1 and the second thickness t2, it is merely for convenience of explanation, and thickness 't' of the rough layer 110 is not limited thereto. The rough layer 110 may include three or more thicknesses different from one another.

A first light beam and a second light beam of different wavelength bands may be transmitted through the rough layer 110 according to some example embodiments. The rough layer 110 may exhibit a transmittance of about 91% or higher with respect to lights of a wavelength band from about 400 nm to about 800 nm. A wavelength band of the first light beam may be narrower than that of the second light beam. The wavelength band of the first light beam may cover shorter wavelengths than the wavelength band of the second light beam. For example, the wavelength band of the first light beam may be a visible band (e.g., wavelength from about 400 nm to about 700 nm), whereas the wavelength band of the second light beam may be an infrared band (e.g., wavelengths from about 700 nm to about 1 millimeter (mm)). However, the inventive concepts are not limited thereto.

The second light beam may be, for example, in a wavelength band from about 700 nm to about 1,050 nm (although in the infrared band, these wavelengths may be visible to a user). However, the inventive concepts are not limited thereto.

The wavelength band of the first light beam may be, for example, an ultraviolet band (e.g., wavelength from about 10 nm to about 400 nm), whereas the wavelength band of the second light beam may be the visible band (e.g., wavelengths from about 400 nm to about 700 nm). However, the inventive concepts are not limited thereto.

The first light beam may be, for example, in a wavelength band from about 310 nm to about 400 nm (although in the ultraviolet band, these wavelengths may be visible to a user). However, the inventive concepts are not limited thereto.

The wavelength band of the first light beam may be, for example, a portion of the visible band (e.g., wavelength from about 400 nm to about 500 nm), whereas the wavelength band of the second light beam also may be a portion of the visible band (e.g., wavelengths from about 600 nm to about 700 nm). However, the inventive concepts are not limited thereto.

The first light beam may be, for example, in a wavelength band from about 310 nm to about 700 nm. However, the inventive concepts are not limited thereto. Having the wavelength band of the first beam outside of or overlapping the visible band may impact the color perception of a user.

The second light beam may be, for example, in a wavelength band from about 400 nm to about 1,050 nm. However, the inventive concepts are not limited thereto. Having the wavelength band of the second beam in or overlapping the visible band may impact the color perception of a user.

The rough layer 110 may have a regular pattern. The regular pattern may extend in on, two, or three dimensions of the rough layer 110. The rough layer 110 may not have a regular pattern, as long as the rough layer 110 provides a desired surface roughness or provides the feel associated with actual handwriting.

The first light beam may be incident via the photonic crystal layer 120 and may be transmitted through the rough layer 110. Furthermore, the second light beam may be incident via a surface of the rough layer 110, reflected by the photonic crystal layer 120, and may be emitted back to outside via the rough layer 110. The first surface S1 and the second surface S2 of the rough layer 110 may be perpendicular to a direction in which the first light beam travels, whereas the third surface S3 may be parallel to the direction in which the first light beam travels. Therefore, reflection of the first light beam due to the rough layer 110 may be reduced.

A distance 'd' between two different thicknesses of the rough layer 110 adjacent to each other may be smaller than wavelength of the second light beam. Therefore, even if the second light beam is incident to the rough layer 110 at a tilted angle, diffuse reflection of the second light beam may be reduced. For example, a distance between the first and second thicknesses t1-t2 of the rough layer 110 adjacent to each other may be from about 200 nm to about 20 µm.

Furthermore, to reduce diffuse reflection of the second light beam even in case where the second light beam is incident to the rough layer 110 at a tilted angle, width 'w' of the protrusions 112 inside the rough layer 110 may be smaller than wavelength of the second light beam. For the same reason, a distance 'd' between the protrusions 112 of the rough layer 110 adjacent to each other may be smaller than wavelength of the second light beam. For example, at least one of the width 'w' of the protrusions 112 and the distance 'd' between the protrusions 112 adjacent to each other may be from about 200 nm to about 20 µm.

The rough layer 110 may be formed of a transparent material. For example, the rough layer 110 may be formed of glass.

The rough layer 110 shown in FIGS. 1A and 1B is merely an example, and the rough layer 110 may have any of various other structures with non-flat surfaces. Some of the various other structures that may be applied to the rough layer 110 will be described below.

Due to photonic band gap characteristic of the photonic crystal layer 120, the first light beam may be transmitted through the photonic crystal layer 120, whereas the second light beam may be reflected by the photonic crystal layer 120.

The photonic crystal layer 120 may include photonic crystals that form a photonic band gap for reflecting the second light beam. The term "photonic crystal" refers to an artificial crystal that is formed by periodically arranging materials with different dielectric constants to form a photonic band gap (PBG) in the energy spectrum of electromagnetic waves. When lights are incident to a photonic crystal, lights of most wavelengths are transmitted through the photonic crystals without diffusion. However, a reflective area through which light of particular wavelengths (or frequencies) may not be transmitted is formed, where the reflective area is referred to as a photonic band gap. When light having a wavelength (or frequency) within the photonic band gap is incident to the photonic crystal, the light is unable to propagate into the photonic crystal and is reflected. As described above, a photonic crystal has both selective light transmitting characteristics and selective light reflecting characteristics. A photonic crystal is formed by periodically arranging dielectric materials, where size or location of a photonic band gap may vary based on refraction indexes of dielectric materials and periodic structures.

Figure 2:
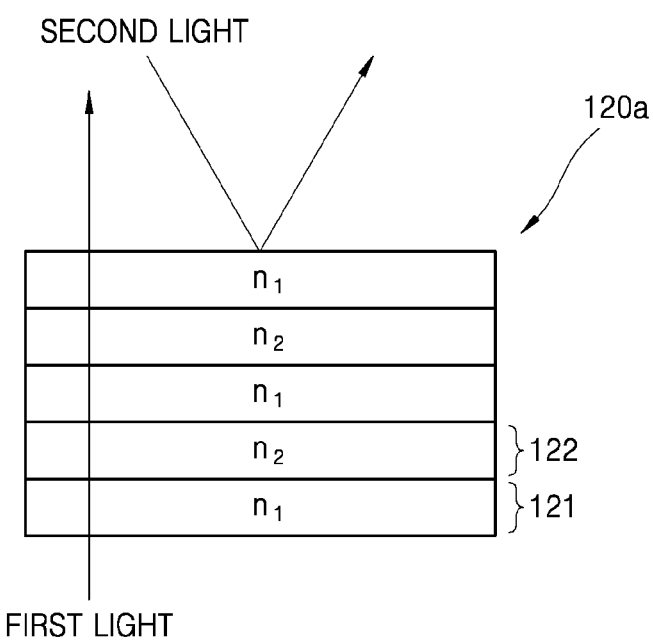
FIG. 2 is a sectional view of a photonic crystal layer having a multi-layer structure.

FIG. 2 is a sectional view of a photonic crystal layer 120a having a multi-layer structure. As shown in FIG. 2, the photonic crystal layer 120a may have a structure in which a plurality of layers 121 and 122 having different refractive indexes n1 and n2 are alternately stacked. Wavelengths of light to reflect may depend on thicknesses of the respective layers, a difference between refractive indexes of the respective layers, etc. The greater the difference between refractive indexes is, the narrower the wavelength band of light to reflect may become. In the photonic crystal layer 120a according to some example embodiments, a plurality of different layers may be alternately stacked to reflect the second light beam.

The plurality of layers 121 and 122 of the photonic crystal layer 120a may be replaced using optical filters to achieve the selective light transmitting characteristics and selective light reflecting characteristics. For example, dichroic filters may be used to control light transmitting and reflecting characteristics in wavelength bands including infrared, visible, and ultraviolet light. Such dichroic filters may include a series of optical coatings. A suitable bandpass filter, for example, may include selected longpass and shortpass filters.

The plurality of layers 121 and 122 of the photonic crystal layer 120a may be replaced using optical filters to achieve the selective light transmitting and reflecting characteristics. For example, guided-mode resonance filters may be used to control light transmitting and reflecting characteristics in wavelength bands including infrared, visible, and ultraviolet light. Such guided-mode resonance filters may include a series of optical coatings. The number of layers required for a guided-mode resonance filter may be fewer than required for an equivalent dichroic filter.

Figure 3:
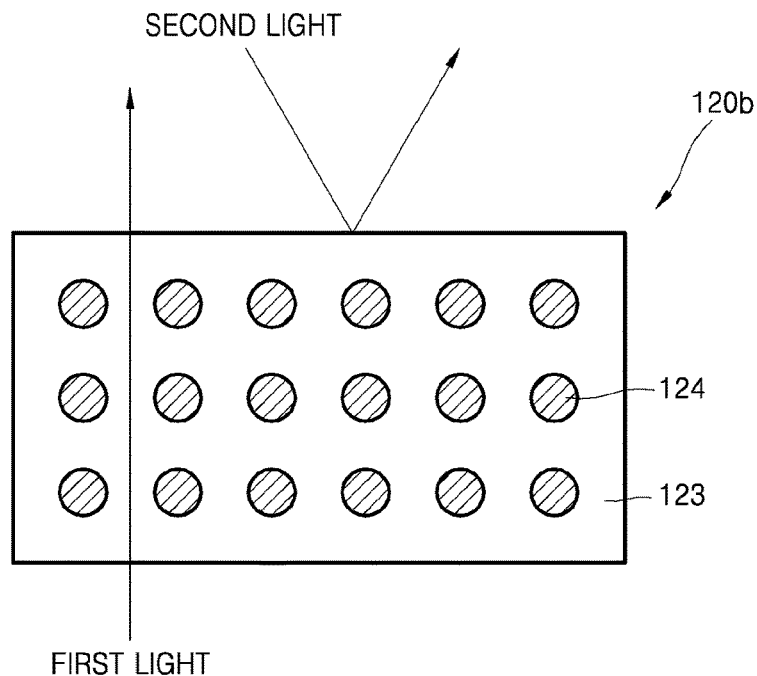
FIG. 3 is a diagram showing a photonic crystal layer including nanoparticles.

FIG. 3 is a diagram showing a photonic crystal layer 120b including nanoparticles. As shown in FIG. 3, the photonic crystal layer 120b may include a medium 123 and nanoparticles 124 dispersed in the medium 123. The nanoparticles 124 may be charged and be dispersed in the medium 123 in a lattice-like structure. In the photonic crystal layer 120b, the nanoparticles 124 are regularly dispersed based on electrokinetic phenomena and form a photonic crystal structure. Photonic band gap depends on a distance 'd' between nanoparticles or size of nanoparticles. Therefore, due to the size of nanoparticles in the photonic crystal layer 120b or a distance 'd' between the same, the photonic crystal layer 120b may reflect the second light beam.

The photonic crystal layer 120b may be replaced using thin-film optics to achieve the selective light transmitting characteristics and selective light reflecting characteristics. For example, photonic crystals more generally may be used to control light transmitting and reflecting characteristics in wavelength bands including infrared, visible, and ultraviolet light.

Figure 4A:
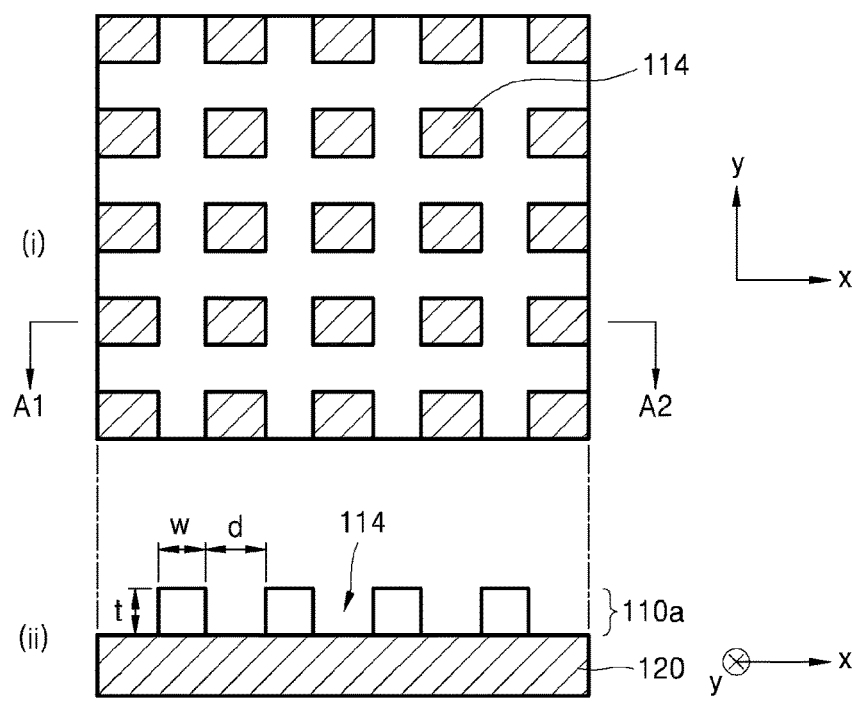
FIGS. 4A through 4C are diagrams showing films for writing including various types of rough layers.
Figure 4B:
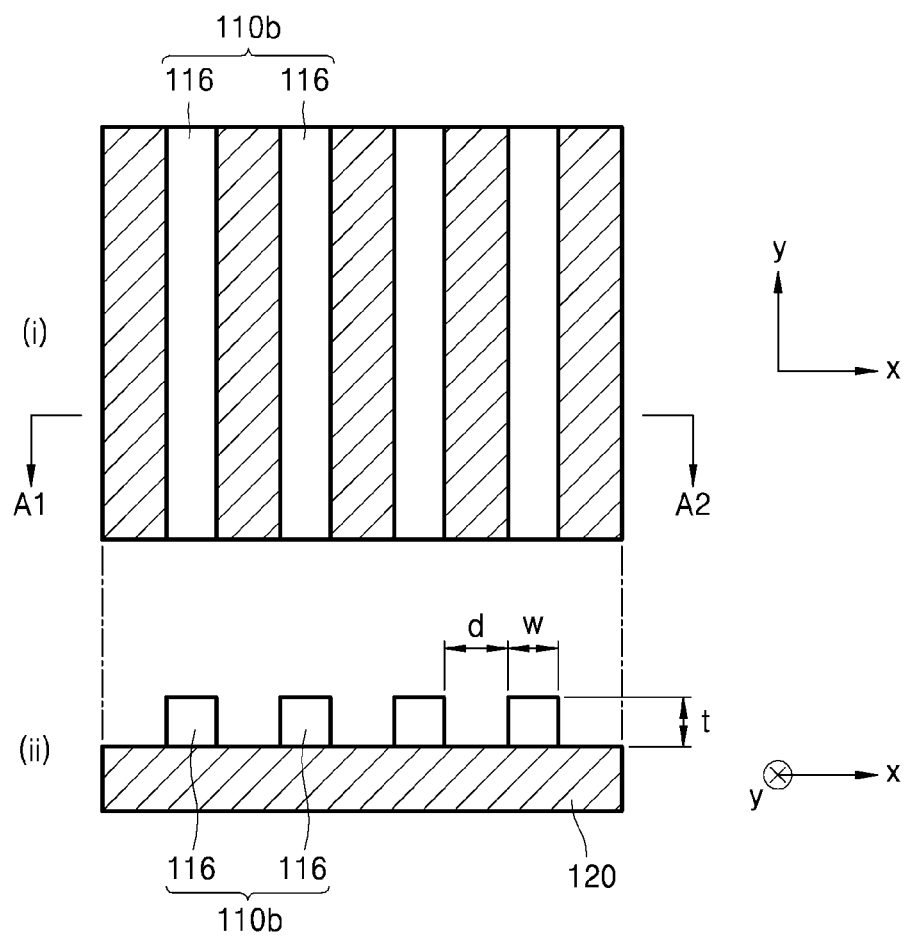
Figure 4C:
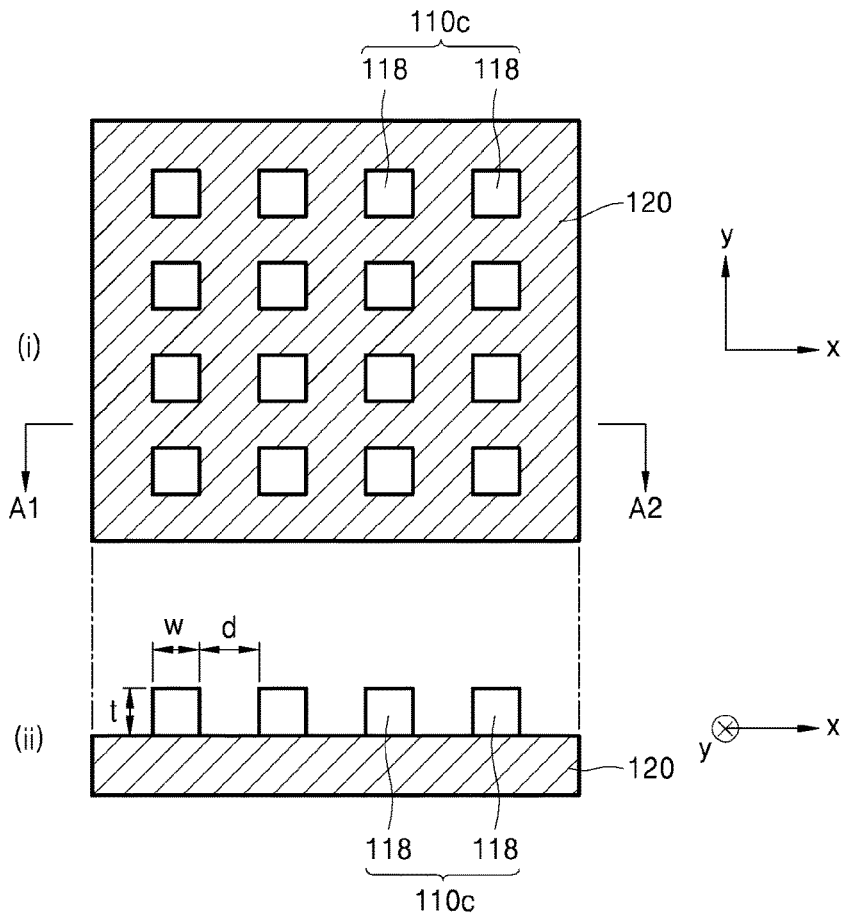

Although FIG. 1A shows an embossed pattern of the surface of the rough layer 110 that is not flat, the inventive concepts are not limited thereto. The rough layer 110 may include any of various other patterns having surface roughness. FIGS. 4A through 4C are diagrams showing films for writing including various types of rough layers. As shown in FIG. 4A, a rough layer 110a may be formed to have a mesh-like structure including a plurality of openings 114.

The plurality of openings 114 may be 2-dimensionally (2D) and periodically arranged. The openings 114 may have a polygonal shape, such as a triangular shape or a rectangular shape, a circular shape, elliptical shape, and any of various other shapes. Size of the openings 114, a distance 'd' between the openings 114, and thickness 't' of the openings 114 may be constant. Since size of the openings 114, a distance 'd' between the openings 114, and thickness T of the openings 114 are constant, the rough layer 110a may have a uniform surface roughness. At least one from among size of the openings 114, a distance 'd' between the openings 114, and thickness T of the openings 114 may be smaller than or equal to wavelength of the second light beam. For example, at least one from among size of the openings 114, a distance 'd' between the openings 114, and thickness T of the openings 114 may from about 200 nm to about 20 μm. Particularly, if the openings 114 smaller than wavelength of the second light beam are periodically arranged, transmittance of the second light beam may be improved due to surface plasmon resonance.

Alternatively, as shown in FIG. 4B, a rough layer 110b may include a plurality of lines 116 arranged apart from one another. A material constituting the lines 116 may be transparent. For example, the lines 116 may include glass. In FIG. 4B, the lines 116 are arranged in the y-axis direction. However, the inventive concepts are not limited thereto. The lines 116 may also be arranged in the x-axis direction. Widths of the lines 116 and a distance 'd' between the lines 116 may be from about 200 nm to about 20 μm.

Alternatively, as shown in FIG. 4C, a rough layer 110c may include a plurality of protrusions 118 arranged apart from one another. The plurality of protrusions 118 may be 2-dimensionally (2D) and periodically arranged. The protrusions 118 may have a polygonal shape, such as a triangular shape or a rectangular shape, a circular shape, elliptical shape, and any of various other shapes. Size of the protrusions 118, a distance 'd' between the protrusions 118, and thickness 't' of the protrusions 118 may be smaller than or equal to wavelength of the second light beam. For example, at least one from among size of the protrusions 118, a distance 'd' between the protrusions 118, and thickness 't' of the protrusions 118 may from about 200 nm to about 20 μm.

Figure 5:
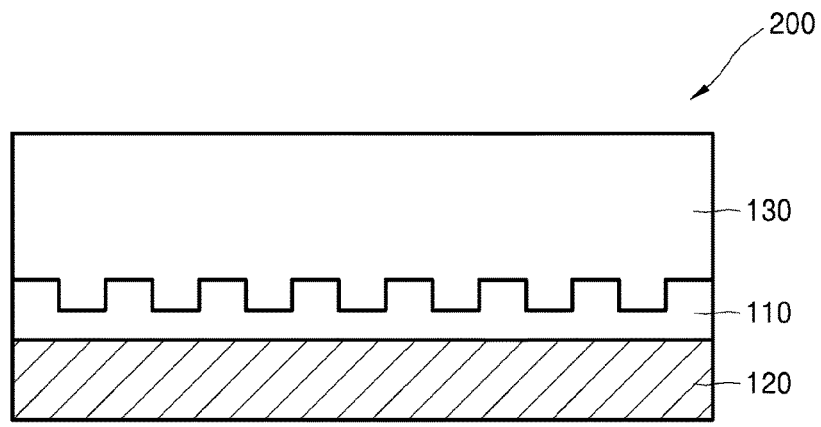
FIGS. 5 through 7 are diagrams showing films for writing according to some example embodiments.
Figure 6:
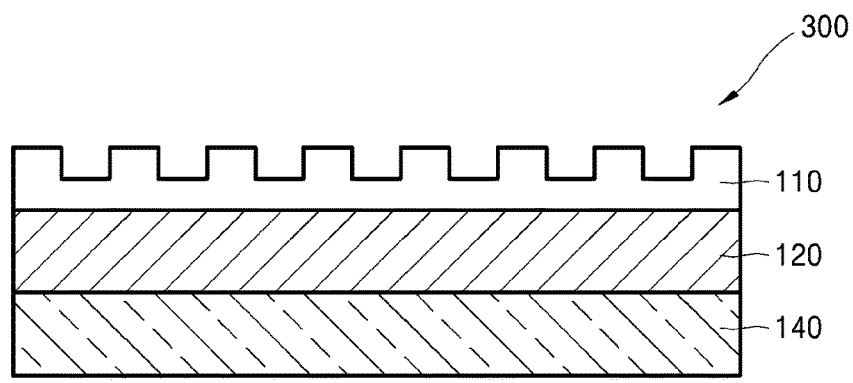
Figure 7:
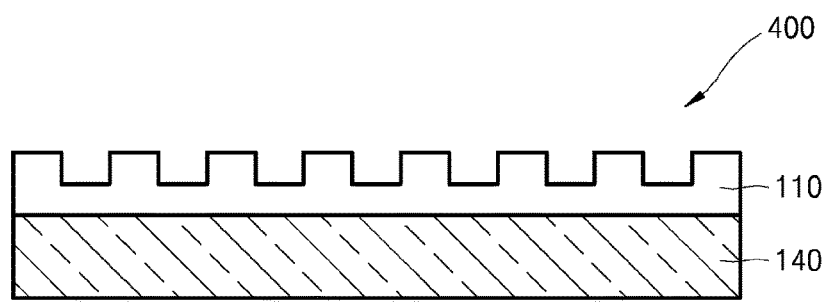

FIGS. 5 through 7 are diagrams showing films for writing according to some example embodiments. Compared to the film for writing 100 of FIG. 1, a film for writing 200 of FIG. 5 may further include a self-curing layer 130 for curing a scratch. Since the rough layer 110 and the photonic crystal layer 120 of FIG. 5 are identical to those described above, detailed descriptions thereof will be omitted.

The self-curing layer 130 may be arranged on a surface of the rough layer 110. When self-curing layer 130 is damaged by a scratch, the scratch is repaired by the self-curing layer 130 as time passes, so that the scratch may become hardly visible.

The self-curing layer 130 may be based on an acrylic resin and may contain surface-treated silica and an acrylate that hardens when exposed to light. The self-curing layer 130 may further include a fluorine-based compound. Furthermore, the self-curing layer 130 may be formed of a material formed by adding a resin composition including acryl-modified polyester polyol and melamine hardener to siloxane-modified epoxy resin, or may be formed of a resin composition containing an acrylic resin, an aliphatic polyester resin, a silicon-modified polyacrylate resin, a polydimethyl siloxane, an alkoxy silane compound, an aliphatic isocyanate hardner, etc. Furthermore, in the self-curing layer 130, nano-sized or micro-sized capsules may be distributed in an acrylic resin. Therefore, when an external shock is applied to the self-curing layer 130, capsules displaced due to the external shock may return to original locations, thereby repairing any damage caused by the external shock.

The self-curing layer 130 may prevent the film for writing 200 from being damaged by usage of a pen. Furthermore, although the surface roughness of the rough layer 110 is insufficient, the restoration of the self-curing layer 130 to its original form after being deformed by pressure applied using a pen increases the surface roughness of the film for writing 200. Furthermore, hardness of the self-curing layer 130 may be less than that of the rough layer 110, thereby reducing awkwardness of handwriting experience on a mobile terminal or a portable device.

A film for writing 300 of FIG. 6 may further include a base layer 140 which is arranged on the photonic crystal layer 120. Since the rough layer 110 and the photonic crystal layer 120 of FIG. 5 are identical to those described above, detailed descriptions thereof will be omitted.

The base layer 140 may be highly adhesive with respect to other layers. Therefore, for example, the base layer 140 may contain at least one from among polyethylene terephthalate (PET), polyethylene terephthalate co-polymer (co-PET), polymethyl metacrylate (PMMA), and polymethyl metacrylate co-polymer (co-PMMA). Hardness of the base layer 140 may be greater than that of a layer arranged on the base layer 140. Therefore, the base layer 140 may protect a display apparatus.

A film for writing 400 of FIG. 7 may include the base layer 140 on the rough layer 110, instead of the photonic crystal layer 120. In some cases, the photonic crystal layer 120 may be omitted. The photonic crystal layer 120 may be selectively arranged based on type of a pen paired with the film for writing 400. Furthermore, although not shown, the film for writing 400 may include the base layer 140, the rough layer 110, and the self-curing layer 130.

The films for writing 100, 200, 300, and 400 may be arranged on a display screen of a display apparatus. Here, the display apparatus may refer to any of various display apparatuses, such as organic light emitting display (OLED) apparatus, a plasma display panel (PDP), a flat cathode ray tube (FCRT), a vacuum fluorescent display (VFD) panel, a light emitting diode (LED) panel, and a liquid crystal display (LCD) panel, and may be either a portable display apparatus or a stationary display apparatus.

Figure 8:
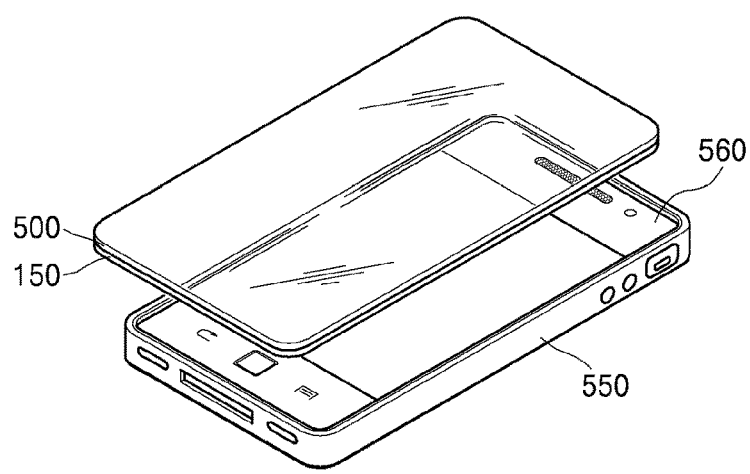
FIG. 8 is a diagram showing that a film for writing according to some example embodiments is attached to a display screen of a display apparatus.

FIG. 8 is a diagram showing that a film for writing 500 according to some example embodiments is attached to a display screen of a display apparatus 550. As shown in FIG. 8, an adhesive layer 150 may be further arranged on the bottom surface of the film for writing 500. Therefore, the film for writing 500 may be detachably attached to a front surface 560 of the display apparatus 550 via the adhesive layer 150. The films for writing 100, 200, 300, and 400 may be applied to the film for writing 500 of FIG. 8. However, since the film for writing 500 is arranged on a display screen of the display apparatus 550, the film for writing 500 may be formed of a material that transmits lights emitted by the display apparatus 550.

Although the film for writing 500 of FIG. 8 may be attached to and detached from a display apparatus, the inventive concepts are not limited thereto. The film for writing 500 may also be integrated with a display apparatus.

Figure 9:
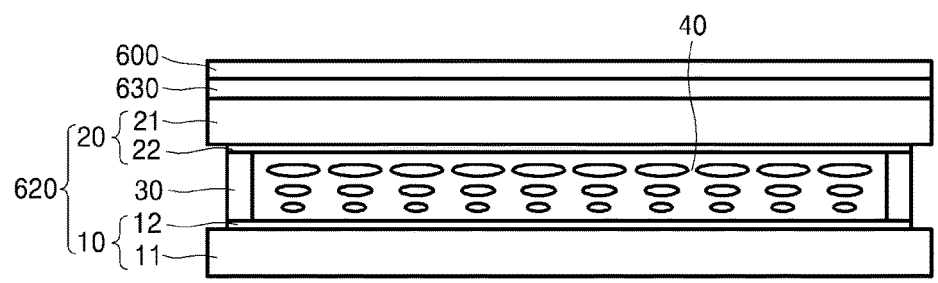
FIG. 9 is a diagram showing a display apparatus including a film for writing.

FIG. 9 is a diagram showing a display apparatus including the film for writing 600. As shown in FIG. 9, the display apparatus includes a display panel 620, a light polarizing plate 630, and the film for writing 600. Although the display apparatus further includes other components (e.g., a driving circuit, a backlight unit, etc.), those components are omitted for convenience of explanation.

The display panel 620 receives light from a backlight unit (not shown) and displays an image in response to a driving signal from a driving circuit (not shown).

The display panel 620 includes an array substrate 10, a color filter substrate 20, a liquid crystal layer 40 interposed between the array substrate 10 and the color filter substrate 20, and a sealant 30.

The array substrate 10 is formed by forming a pixel array layer 12, in which a plurality of pixels are arranged in a matrix shape, on a first base substrate 11. Although not shown, each of the pixel is defined by gate lines and data lines, which are formed to cross each other and be insulated from each other, and includes a thin-film transistor (TFT) and a pixel electrode electrically connected to the TFT. The TFT switches a voltage applied to the pixel electrode. A data line applies a pixel voltage to a corresponding TFT, whereas a gate line applies a gate voltage to a correspond TFT. Therefore, each pixel applies a pixel voltage to a pixel electrode in response to a gate voltage.

The array substrate 10 and the color filter substrate 20 are combined with each other to face each other. The color filter substrate 20 is formed by forming a color array layer 22 on a second base substrate 21. The color array layer 22 includes a color filter layer, a black matrix, and a common electrode. The color filter layer includes a plurality of color pixels respectively corresponding to the plurality of pixels, and the black matrix is formed at a location corresponding to the gate lines and the data lines. The common electrode is formed on the plurality of color pixels and the black matrix and faces the pixel electrodes. A common reference voltage is applied to the common electrode. Therefore, as transmittance of the liquid crystal layer 40 is controlled based on a potential difference between a pixel voltage and the common voltage, an image is displayed on the display panel 620.

The liquid crystal layer 40 is injected into the space between the array substrate 10 and the color filter substrate 20 via drop filling method or vacuum injection method. Alignment direction of liquid crystals constituting the liquid crystal layer 40 is changed based on a potential difference between a pixel voltage and the common voltage, and transmittance of light provided by a backlight unit varies based on the alignment direction.

The sealant 30 is interposed between the array substrate 10 and the color filter substrate 20, and combines the array substrate 10 and the color filter substrate 20 to each other. Furthermore, the sealant 30 seals the space between the array substrate 10 and the color filter substrate 20 to prevent the liquid crystal layer 40 from leaking out.

The light polarizing plate 630 is attached onto the display panel 620 and polarizes light provided to the display panel 620. The light polarizing plate 630 may be formed to have a multilayer structure that includes not only a layer including a polarizer, but also a supporting layer for maintaining durability, mechanical strength, and heat resistance of the light polarizing plate 630, an anti-static (AS) layer for preventing a static electricity generated by the light polarizing plate 630 from flowing into a display panel, etc.

The film for writing 600 may be attached on the top surface of the light polarizing plate 630. The films for writing 100, 200, 300, and 400 as described above may be applied as the film for writing 600. If the film for writing 600 is integrated with the display apparatus, it may be necessary for the film for writing 600 to include a base layer to prevent the display apparatus from being damaged.

Although a LCD display apparatus is shown as an example of display apparatuses, it is merely for convenience of explanation, and the inventive concepts are not limited thereto. The display apparatus may also include an organic light emitting display apparatus (OLED), a plasma display panel (PDP), a flat cathode ray tube (FCRT), a vacuum fluorescent display panel (VFD), a light emitting diode (LED) panel, etc.

Figure 10:
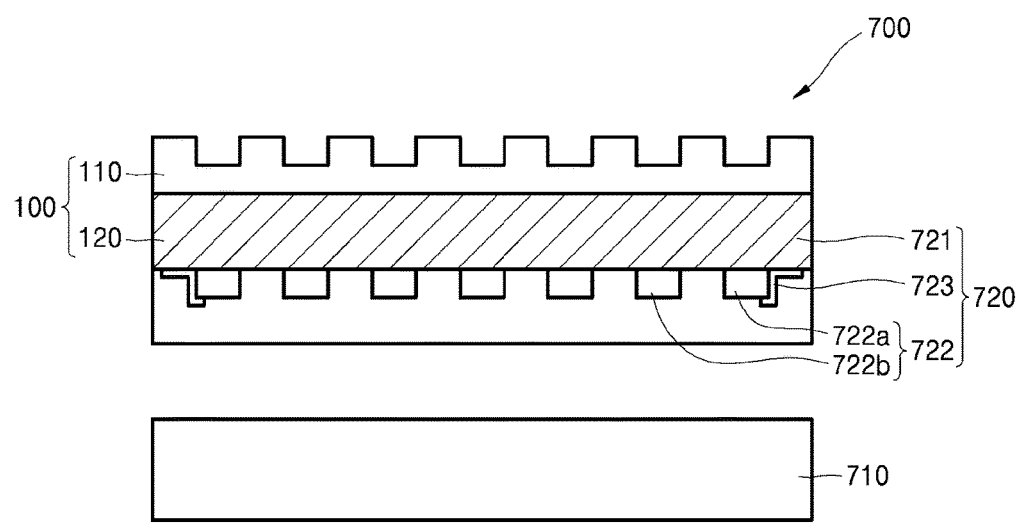
FIG. 10 is a diagram showing a portion of a display apparatus including a touch panel, according to some example embodiments.

Furthermore, a display apparatus may further include a touch panel. FIG. 10 is a diagram showing a portion of a display apparatus including a touch panel, according to some example embodiments. The touch panel may be a resistive-film type or an electrostatic-capacitance type, where the latter is exemplified in FIG. 10. As shown in FIG. 10, a display apparatus 700 may include a display panel 710 and a touch panel 720, which is arranged on the display panel 710 to receive touch inputs. Here, the display panel 710 may not only be the display panel 620 as shown in FIG. 9, but also be any of various other display panels including an organic light emitting display panel.

Referring to FIG. 10, the touch panel 720 includes a base layer 721, a plurality of conductive detecting cells 722 formed below the base layer 721, and location detecting lines 723 for connecting the conductive detecting cells 722 to an external driving circuit.

The conductive detecting cells 722 are formed at a touch activating area on a surface of the base layer 721 by using a transparent electrode material, such as indium-tin-oxide (ITO) and includes first detecting cells 722a connected in a first direction and second detecting cells 722b connected in a second direction, where the second direction is different from the first direction. The first detecting cells 722a and the second detecting cells 722b may be arranged on a same layer, and may be connected in the first direction and the second direction by first connecting patterns (not shown) and second connecting patterns (not shown) that are insulated from each other by interposing an insulation layer therebetween or may be arranged on different layers by interposing an insulation layer therebetween.

When an object, such as a man's hand or a stylus pen, contacts the touch panel 720, changes of electrostatic capacitance based on contacted locations are transmitted from the conductive detecting cells 722 to a driving circuit (not shown) via the location detecting lines 723.

Furthermore, the film for writing 100 as shown in FIG. 1 may be arranged on the base layer 721. Alternatively, the photonic crystal layer 120 of the film for writing 100 may function as the base layer 721 of the touch panel 720. Although the film for writing 100 of FIG. 1 is shown in FIG. 10, the inventive concepts are not limited thereto, and any of various types of films as described above may be applied.

Pens that may be paired with the film for writing according to some example embodiments may include an optical pen using light and a digital pen using electromagnetic signals. A stylus pen employed for a touch panel is a digital pen. Furthermore, the film for writing may include a reflective type, for which movement of a pen is detected by the pen, and a transmissive type, for which movement of a pen is detected by another device (e.g., a display apparatus). Generally, movement of a digital pen is detected by a display apparatus, for example. Therefore, the transmissive film for writing may be employed. The transmissive film for writing does not necessarily include the photonic crystal layer 120 as described above.

Figure 11:
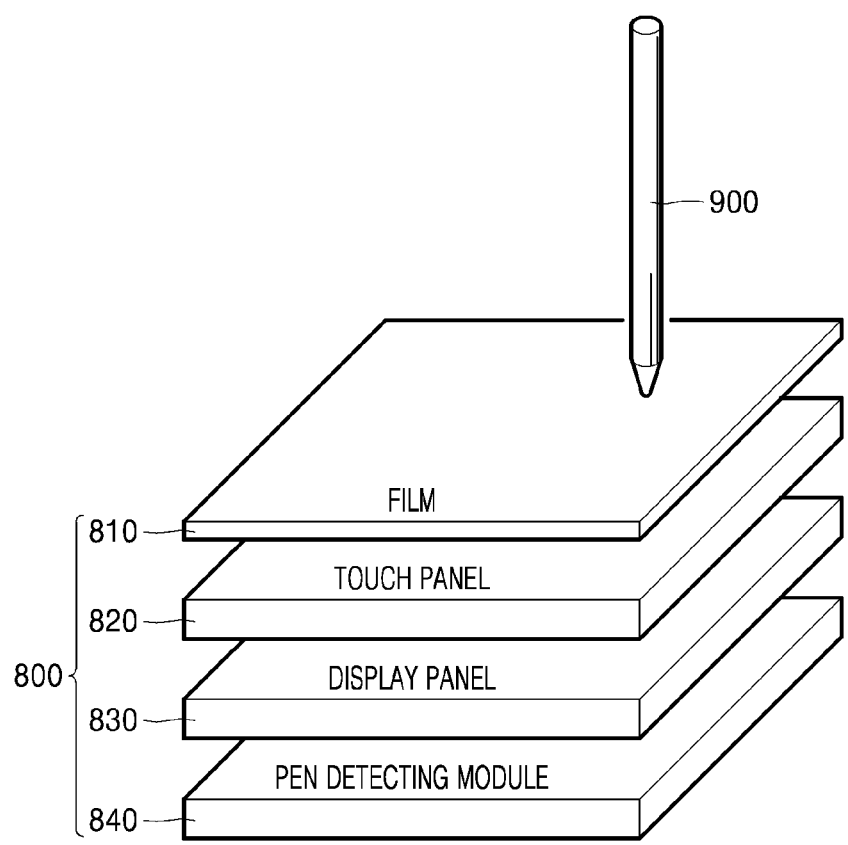
FIG. 11 is a diagram schematically showing a display apparatus including a separate pen detecting module according to some example embodiments.

A device employing a transmissive film for writing may further include a separate pen detecting module other than a touch panel. FIG. 11 is a diagram schematically showing a display apparatus including a separate pen detecting module according to some example embodiments. As shown in FIG. 11, a display apparatus 800 may include a film 810 to be contacted by a pen 900, a touch panel 820 for detecting a user's touch, a display panel 830 for outputting images, and a pen detecting module 840 for detecting movement of the pen 900. Although the pen detecting module 840 is arranged below the display panel 830 in FIG. 11, the inventive concepts are not limited thereto. The pen detecting module 840 may also be arranged above the display panel 830. A detecting mechanism of the pen detecting module 840 may be integrated with a tip of the pen 900. For example, if a source of the pen 900 emits light, the pen detecting module 840 may include an optical sensor. If a source of the pen 900 emits a magnetic field, the pen detecting module 840 may include a magnetic sensor. Since it is optional for a transmissive film to reflect particular light, the photonic crystal layer 120 as described above may be omitted.

Figure 12:
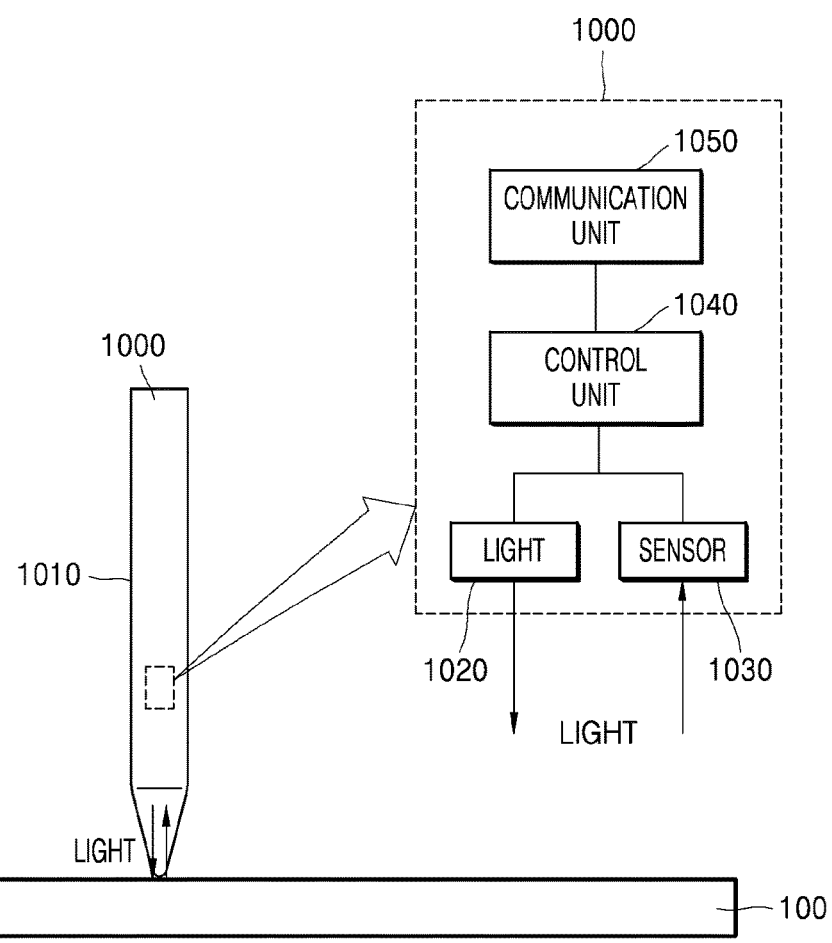
FIG. 12 is a diagram showing an optical pen for detecting reflected lights, according to some example embodiments.

Meanwhile, light emitted by a pen may be detected after being reflected by the film for writing 100. For example, a pen may detect movement of the pen by detecting reflected lights. FIG. 12 is a diagram showing an optical pen for detecting reflected lights, according to some example embodiments. As shown in FIG. 12, an optical pen 1000 includes a housing 1010, a light source 1020, which is arranged in the housing 1010 and emits light to a film for writing 100, a sensor 1030 for detecting lights reflected by the film for writing 100, a control unit 1040 for obtaining information regarding movement of the optical pen 1000 by using the detected lights, and a communication unit 1050 for transmitting information regarding movement of the optical pen 1000 to an external device (e.g., a display apparatus). Information regarding movement of the optical pen 1000 may include images and/or texts. The film for writing 100 of FIG. 12 may not only be the film for writing 100 of FIG. 1, but also be the films for writing 100, 200, and 300 of FIGS. 2 through 6. The modified rough layers 110a through 110c may also be applied.

Figure 13:
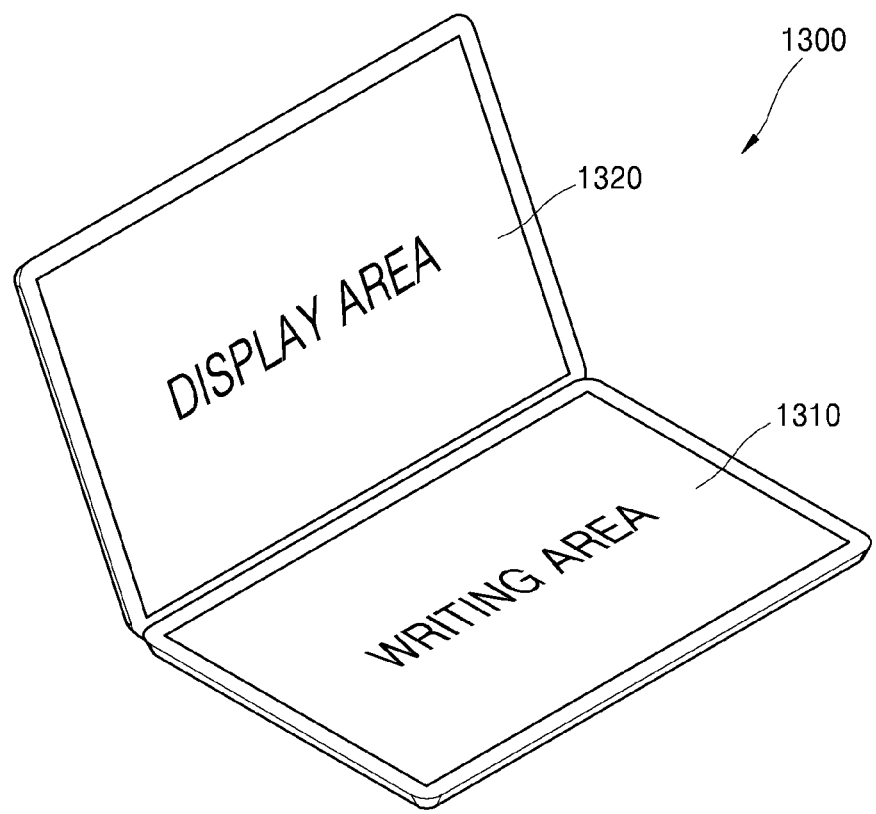
FIG. 13 is a diagram showing a display apparatus in which a detecting area and a display area are separately arranged.

The film for writing 100 may be arranged on a display screen of a display apparatus. However, the inventive concepts are not limited thereto. The film for writing 100 may be applied not only to a display apparatus, but also an electronic device with pen writing function. Furthermore, the film for writing 100 may also be arranged at an area of a display apparatus other than a display screen. FIG. 13 is a diagram showing a display apparatus in which a detecting area and a display area are separately arranged. As shown in FIG. 13, a display apparatus 1300 may be divided into a writing area 1310, to which information is input based on movement of a pen, and a display area 1320, which displays information. The outermost layer of the writing area 1310, that is, a layer contacting outside may be the film for writing 100 as described above. Since no image is displayed at the writing area 1310, it is not necessary for the film for writing 100 to be transparent. In other words, at least one layer of the film for writing 100 may be formed of a non-transparent material.

As described above, according to one or more of the above example embodiments, since a film for writing has a designated surface roughness, the film for writing may provide a handwriting experience on a mobile terminal or portable device similar to that when using a pen to write on paper. Furthermore, pen usage on a mobile terminal or portable device may increase.

It should be understood that the example embodiments described herein should be considered in a descriptive sense only and not for purposes of limitation. Descriptions of features or aspects within each embodiment should typically be considered as available for other similar features or aspects in other embodiments.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A film for writing, comprising:
   a rough layer, comprising a non-flat surface, configured to transmit a first light beam and a second light beam of different wavelength bands and formed of glass; and
   a photonic crystal layer, arranged on the rough layer, configured to transmit the first light beam, wherein the first light beam is incident on a bottom surface of the photonic crystal layer from a first outside of the photonic crystal layer to output to a second outside through the photonic crystal layer, the photonic crystal layer further configured to reflect the second light beam, wherein the second light beam is incident on an upper surface of the photonic crystal layer from the second outside of the photonic crystal layer, the first outside of the photonic crystal layer being different from the second outside of the photonic crystal layer.

2. The film for writing of claim 1, wherein a difference between a maximum thickness and a minimum thickness of the rough layer is from about 220 nanometers (nm) to about 2 microns (μm).

3. The film for writing of claim 1, wherein the rough layer is transparent, and
   wherein the photonic crystal layer is transparent.

4. The film for writing of claim 1, wherein the non-flat surface of the rough layer comprises:
   a first surface perpendicular to a direction in which the first light beam is configured to travel; and
   a second surface parallel to the direction in which the first light beam is configured to travel.

5. The film for writing of claim 1, wherein the rough layer has a mesh structure comprising a plurality of openings.

6. The film for writing of claim 5, wherein at least one of a diameter of each of the plurality of openings and a distance between openings adjacent to each other is less than or equal to a wavelength of the second light beam.

7. The film for writing of claim 1, wherein the rough layer further comprises:
   a plurality of lines spaced apart from one another.

8. The film for writing of claim 7, wherein at least one of width of each of the plurality of lines and a distance between lines adjacent to each other is less than or equal to a wavelength of the second light beam.

9. The film for writing of claim 1, wherein the rough layer further comprises:
   a plurality of protrusions spaced apart from one another.

10. The film for writing of claim 1, wherein
    wherein the second light beam is incident via the non-flat surface of the rough layer.

11. The film for writing of claim 1, wherein
    a wavelength band of the first light beam is a visible band, and
    wherein a wavelength band of the second light beam is an infrared band.

12. The film for writing of claim 1, wherein in the photonic crystal layer, a plurality of layers having different refractive indexes are alternately stacked.

13. The film for writing of claim 1, wherein the photonic crystal layer comprises:
    a medium; and a plurality of nanoparticles distributed in the medium in a lattice structure.

14. The film for writing of claim 1, further comprising:
a self-curing layer in contact with the rough layer;
wherein the self-curing layer is configured to repair damage to the self-curing layer caused by external shock.

15. The film for writing of claim 1, wherein the film for writing is configured to attach to and detach from a display apparatus.

16. A display apparatus, comprising:
a display panel; and
the film for writing of claim 1 on the display panel.

17. The display apparatus of claim 16, wherein the non-flat surface of the rough layer of the film for writing is exposed to outside of the display apparatus.

18. The display apparatus of claim 16, further comprising:
a touch panel between the film for writing and the display panel;
wherein the film for writing contacts the touch panel.

* * * * *